United States Patent
So et al.

(10) Patent No.: US 7,801,930 B2
(45) Date of Patent: Sep. 21, 2010

(54) RECORDING MEDIUM, HOST DEVICE, AND DATA PROCESSING METHOD

(75) Inventors: Hirokazu So, Osaka (JP); Takuji Maeda, Osaka (JP); Shinji Inoue, Osaka (JP)

(73) Assignee: Panasonic Corporation, Osaka (JP)

( * ) Notice: Subject to any disclaimer, the term of this patent is extended or adjusted under 35 U.S.C. 154(b) by 1287 days.

(21) Appl. No.: 11/118,406

(22) Filed: May 2, 2005

(65) Prior Publication Data

US 2006/0050622 A1   Mar. 9, 2006

(30) Foreign Application Priority Data

May 10, 2004   (JP)   ............... 2004-139581

(51) Int. Cl.
*G06F 17/30* (2006.01)
(52) U.S. Cl. .............. 707/823; 369/275.1; 714/42
(58) Field of Classification Search ................ 369/292; 714/42; 707/823
See application file for complete search history.

(56) References Cited

U.S. PATENT DOCUMENTS

| | | |
|---|---|---|
| 5,485,439 A | 1/1996 | Hamasaka et al. |
| 2003/0202443 A1* | 10/2003 | Nakagawa et al. ....... 369/53.18 |
| 2005/0216684 A1 | 9/2005 | So et al. |

FOREIGN PATENT DOCUMENTS

JP   5-12092   1/1993

OTHER PUBLICATIONS

ISO/IEC 9293, "Information Technology—Volume and file structure of disk cartridges for information interchange," 1994.
U.S. Appl. No. 11/011,160 to So et al., which was filed on Dec. 15, 2004.
English Language abstract of JP 5-12092.

* cited by examiner

*Primary Examiner*—Khanh B Pham
*Assistant Examiner*—Johnese Johnson
(74) *Attorney, Agent, or Firm*—Greenblum & Bernstein, P.L.C.

(57) ABSTRACT

A semiconductor recording medium holds an open flag showing presence or absence of consistency between content data stored in a data storage section and file system management information, in a system region not directly accessible from a host device. Upon receipt of a write request or erase request to the data storage section from the host device, the semiconductor recording medium automatically updates the open flag to "ON" (value showing possibility of inconsistency). When actual consistency is verified, the host device requests the recording medium to set the open flag to "OFF" (value showing presence of consistency). When mounting, the host device refers to the open flag with a special command to judge necessity for error check process.

14 Claims, 10 Drawing Sheets

Fig.6

| STATE AFTER A SERIES OF WRITE OPERATION TO SEMICONDUCTOR RECORDING MEMORY | | |
|---|---|---|
| | HOST DEVICE OF THE INVENTION | HOST DEVICE IN PRIOR ART |
| NORMAL END | OFF | ON |
| ABNORMAL END | ON | ON |

*Fig.10*

| | "SET" BEFORE CHANGEOVER | "SET" AFTER CHANGEOVER | CHANGE IN OPEN FLAG ON CHANGEOVER OF REGION | | |
|---|---|---|---|---|---|
| | | | 1ST OPEN FLAG (SET 1) | 2ND OPEN FLAG (SET 2) | 3RD OPEN FLAG (SET 3) |
| (a) | SET 1 | SET 2 | AS IT STANDS | AS IT STANDS | ON |
| (b) | SET 1 | SET 3 | ON | ON | ON |
| (c) | SET 2 | SET 1 | AS IT STANDS | AS IT STANDS | ON |
| (d) | SET 2 | SET 3 | ON | ON | ON |
| (e) | SET 3 | SET 1 | ON | ON | ON |
| (f) | SET 3 | SET 2 | ON | ON | ON |

RECORDING MEDIUM, HOST DEVICE, AND DATA PROCESSING METHOD

BACKGROUND OF THE INVENTION

1. Field of the Invention

The present invention relates to a recording medium, a host device accessing the recording medium, and a data processing method between a recording medium and a host device. More particularly, the invention relates to error check processing when the host device mounts a recording medium which is a semiconductor recording medium.

2. Related Art

The recording medium for recording digital data such as music contents, moving picture contents and still picture contents is available in various types including semiconductor recording medium, magnetic disk, optical disk, and magneto-optical disk. Among them, the semiconductor recording medium can be reduced in size and weight, and thus it is widely used recently mainly in portable appliances such as digital still camera and mobile telephone terminal. Representative examples of semiconductor recording medium include SD Memory Card (registered trademark), Memory Stick (registered trademark), and Compact Flash (registered trademark). These semiconductor recording media tend to increase in capacity by doubles every year.

Digital data stored in recording region of the semiconductor recording medium is managed by a file system. A file system manages the recording region by dividing it into sectors which are minimum access units and clusters which are sets of sectors, and manages one or more clusters as file.

One of the existing file systems is FAT file system (see non-patent document 1). FAT file system is generally used in personal computers (PCs) and other information appliances, and is also a principal file system in the semiconductor recording medium. In a file system, generally, as the capacity of the recording region increases, the information required for its management (hereinafter called "file system management information") also increases.

A host device of the semiconductor recording medium such as portable appliance performs mounting process, as prior process for processing digital data stored in the recording region of the semiconductor recording medium. In the mounting process, specifically, the file system management information is read and analyzed, and errors in the read file system management information are checked.

If abnormality is found in the file system management information, the host device must execute error handling or error correction properly. Otherwise, fatal troubles such as the followings may occur. The digital data recorded in the semiconductor recording medium is abandoned in irreparable state by the host device, the digital data recorded by one host device may not be normally reproduced by the other host device, and so on. Hence, for the host device executing write process, error check of the file system management information is an indispensable process.

However, due to increase of the file system management information as a result of enlarged capacity, the error checking time increases more and more in the mounting process in the host device. Hence, the user has to wait always for a specific time before use of recording medium, and the convenience is lowered.

The same problem also occurs when the number of error check items is increased for the purpose of enhancing the reliability.

Hitherto, to solve this problem, the following method has been proposed (for example, see patent document 1).

In patent document 1, an "open flag" showing whether the host device is using the semiconductor recording medium or not is stored in the recording region of the recording medium. This open flag is set to ON when the host device starts a series of write process, and set to OFF when the file system management information achieves consistency after completion of series of write process. This open flag shows presence or absence of consistency of data stored in the semiconductor recording medium with the file system.

When mounting the semiconductor recording medium, the host device refers to the open flag. It is judged that the series of write process is interrupted in the midst of the process, when the flag is ON. It is judged that the series of write process is normally finished, when the flag is OFF. Thus, patent document 1 presents a method of simplifying judgment as to whether the file system management information requires a correction or not by referring to the open flag.

Patent document 1: JP 05-12092 A

Non-patent document 1: ISO/IEC 9293, "Information Technology—Volume and file structure of disk cartridges for information," 1994

However, the prior art has the following problems.

That is, in patent document 1, since the open flag is provided in the recording region which can be freely read and written by any host device, it must be guaranteed that all host devices writing in the recording region must process the open flag correctly. Otherwise, the open flag of OFF does not always indicate that the file system management information achieves consistency.

More specifically, in the recording medium of patent document 1, the open flag is updated by direct instruction from the host device. In other words, the open flag is turned on or off by a command or direct writing from the host device. When data is recorded in the semiconductor recording medium having an open flag, by a host device not having function of processing an open flag, and if finished abnormally, the open flag is, OFF (showing presence of consistency) although the data and file system are not consistent. Afterwards, in such a recording medium, when a host device having an open flag processing function processes based on this false open flag, an operation trouble may occur.

Thus, in the method of patent document 1, if the recording medium having open flag is once accessed by a host device not applicable to an open flag, the reliability of an open flag may be spoiled. Hence, there is a problem that data cannot be exchanged between a conventional host device not having an open flag processing function and a new host device applicable to an open flag, by using a semiconductor medium having the open flag.

SUMMARY OF THE INVENTION

In the light of the above problems, it is hence an object of the invention to provide a recording medium, a host device of the recording medium, and a data processing method, which are capable of exchanging data with a conventional host device not having an open flag processing function, and capable of easily recognizing matching of the file system management information when mounting.

A recording medium according to the invention which stores data and is accessible from a host device, includes a data storage section that stores various data, a host interface section that communicates with the host device, and a controller that controls the recording medium. The data storage section includes a data region for storing content data, and a retrieval information storing region for storing management information used by the host device to acquire the content data. The data storage section further stores an open flag showing possibility of inconsistency between information stored in the data region and information stored in the retrieval information storing region. The controller updates the value of the open flag automatically to a value showing that there is a possibility of inconsistency, when receiving a write request or erase request to the data storage section from the host device.

A host device according to the invention accesses a recording medium which includes a data region for storing content data, and a retrieval information storing region for storing management information used for reading the content data, and further stores an open flag showing possibility of inconsistency between information stored in the data region and information stored in the retrieval information storing region. The host device includes an access section that exchanges information with the recording medium, and a data processing section that controls operation of the host device. The data processing section refers to the open flag. When the value of the open flag shows possibility of inconsistency, the data processing section executes verification process of checking if inconsistency actually occurs between the information stored in the data region and the information stored in the retrieval information storing region of the recording medium. Otherwise when the value of the open flag does not show possibility of inconsistency, the verification process is omitted.

A data processing method according to the invention is implemented between a host device and a recording medium. The recording medium includes a data region for storing content data, and a retrieval information storing region for storing management information used for reading the content data, and stores an open flag showing possibility of inconsistency between the information stored in the data region and the information stored in the retrieval information storing region. According to the data processing method, the open flag is updated automatically to a value showing possibility of inconsistency in the recording medium when write process or erase process occurs in the recording medium. After completion of write process or erase process, only when inconsistency does not occur between the information stored in the data region in the recording medium and the information stored in the retrieval information storing region, a request for updating the value of the open flag to a value showing no possibility of inconsistency is transmitted from the host device to the recording medium.

According to the invention, as far as consistency of file system management information of the recording medium is confirmed, error checking process of file system management information on mounting can be omitted, and also exchange of data with a conventional host device is enabled through the recording medium. This benefit is particularly effective in the semiconductor information medium and the host device which are henceforth expected to be increased in capacity.

BRIEF DESCRIPTION OF THE DRAWINGS

FIG. 6 is a diagram of state example of the open flag after a series of write process in the first embodiment of the invention.

FIG. 10 is a diagram showing an example of an open flag transition table in the second embodiment of the invention.

DETAILED DESCRIPTION OF THE PREFERRED EMBODIMENTS

Figure 1:
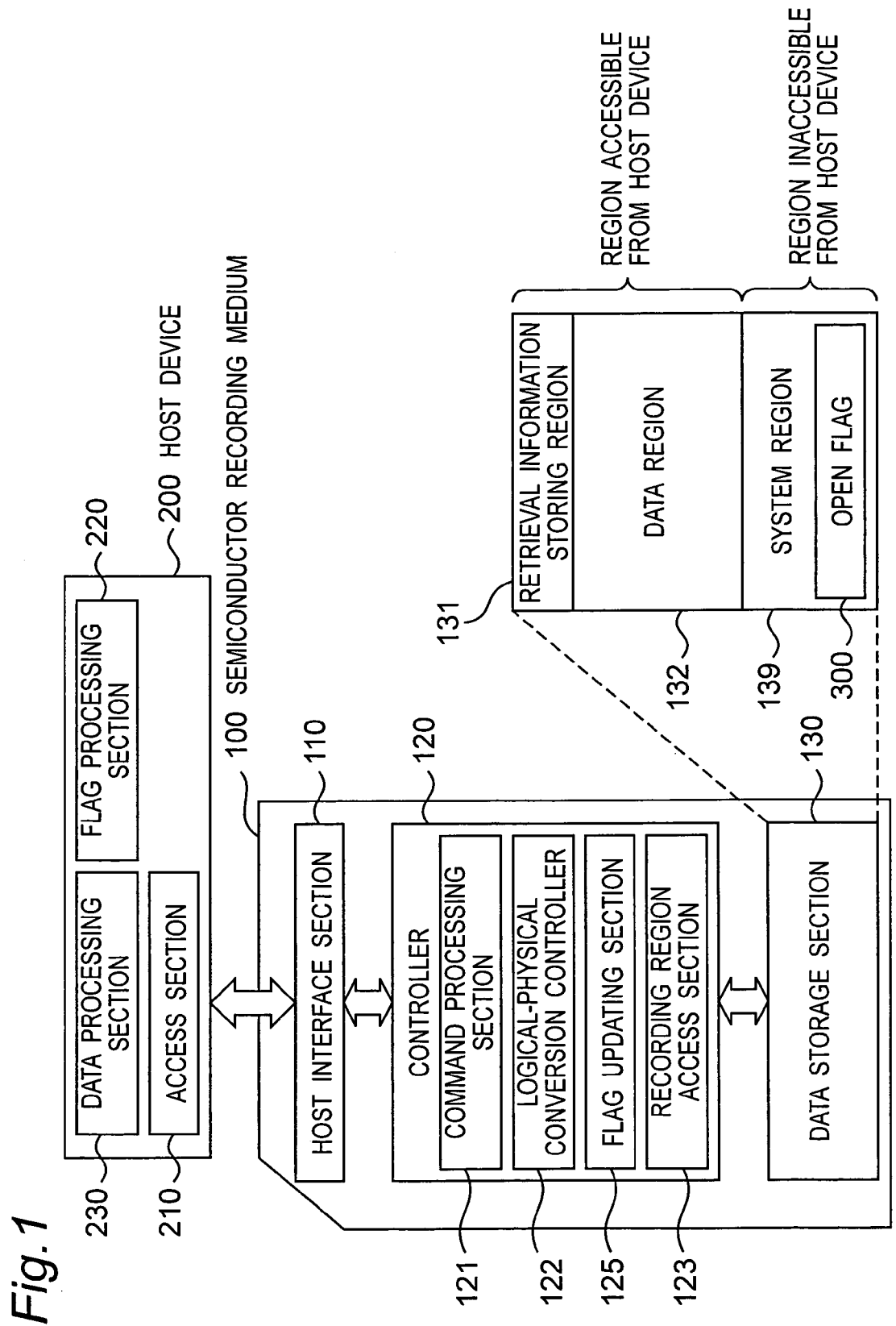
FIG. 1 is a block diagram of a semiconductor recording medium and a host device in a first embodiment of the invention.

Referring now to the accompanying drawings, preferred embodiments of a recording medium, a host device, and a data processing method of the invention are described specifically below.

First Embodiment

A first embodiment of the invention is specifically described below by referring to the drawing.

FIG. 1 is a block diagram of a semiconductor recording medium 100 according to the invention, and a host device 200 which accesses the semiconductor recording medium 100.

The semiconductor recording medium 100 is a recording medium detachable from the host device, and includes a host interface section 110, a controller 120, and a data storage section 130.

The host interface section 110 exchanges information with the host device 200 of the semiconductor recording medium 100.

The controller 120 controls the semiconductor recording medium 100 internally, and includes a command processing section 121, a logical-physical conversion controller 122, a recording region access section 123, and a flag updating section 125.

The command processing section 121 interprets and executes the command received from the host device 200 and at the host interface section 110, and sends the result as required to the host device 200 through the host interface section 110.

The logical-physical conversion controller 122 converts from the logical address specified when the host device 200 accesses, to the physical address in the data storage section 130.

The recording region access section 123 accesses the digital data stored in the data storage section 130 on the basis of the information of physical address calculated by the logical-physical conversion controller 122.

The flag updating section 125 updates the value of an open flag 300 (detail is described later).

The data storage section 130 is a portion for storing digital data, and physically it is composed of nonvolatile memory such as flash memory. The data storage section 130 includes a retrieval information storing region 131, a data region 132, and a system region 139.

The retrieval information storing region 131 and data region 132 are regions to/from which data can be written/read arbitrary by the host device 200.

The data region 132 is a region for storing arbitrary digital data (content data).

The retrieval information storing region 131 is a region for storing management information (logical address, size, etc.) which is necessary for obtaining digital data (contents data) stored in the data region 132 by the host device. In this embodiment, the digital data stored in the data region 132 is managed by the FAT file system, and the information (file system management information) necessary in the FAT file system is stored in the retrieval information storing region 131.

Figure 2:
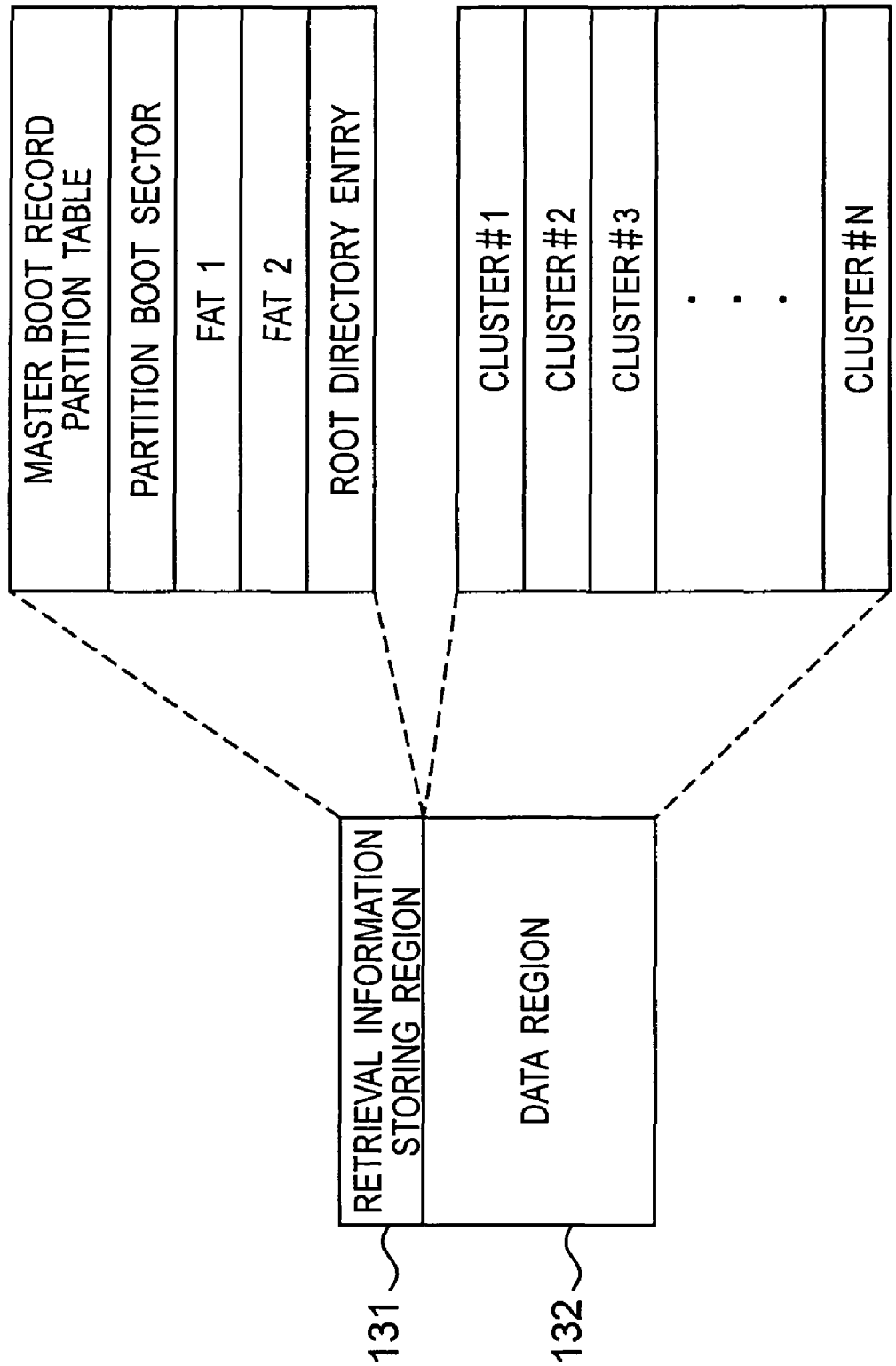
FIG. 2 is a block diagram of retrieval information storing region and data region in the first embodiment of the invention.

FIG. 2 shows a configuration of the retrieval information storing region 131 and data region 132 conforming to the FAT file system. In FIG. 2, the retrieval information storing region 131 includes a master boot record partition table for storing information for managing the data region 132 by dividing it into plural regions, which are called partitions, a partition boot sector for storing management information in one partition, FAT table 1 and FAT table 2 for indicating storage positions of data contained in a file, and a root directory entry for storing information of a file and a directory existing immediately beneath the root directory. The data region 132 is divided into units called clusters and managed by the unit.

Back to FIG. 1, the system region 139 is a region which is not directly accessible from the host device 200, and is a region accessible from the semiconductor recording medium 100, and is a region for storing internal register information or the like of the semiconductor recording medium 100. The system region 139 includes file system management information stored in the retrieval information storing region 131, and an open flag 300 showing presence or absence of possibility of inconsistency with digital data stored in the data region 132.

The open flag 300 has at least two values of "ON" and "OFF". "ON" shows the possibility of inconsistency between the actually stored data and the information in the file system, and "OFF" shows successful consistency.

The host device 200 includes an access section 210, a flag processing section 220, and a data processing section 230.

The access section 210 exchanges information of command and data with the semiconductor recording medium 100 loaded in the host device 200.

The flag processing section 220 controls a value of the open flag 300 of the semiconductor recording medium 100. More specifically, it acquires the value of the open flag 300 or notifies the timing of setting the value of the open flag 300 to "OFF" through the access section 210.

The data processing section 230 is a portion for processing the data stored in the semiconductor recording medium 100 or data to be stored newly, and plays a main role of processing in operation control of the host device 200.

Operation of components of the semiconductor recording medium 100 and the host device 200 is explained below by referring to the accompanying drawings.

Firstly, the entire operating sequence of the semiconductor recording medium 100 is described.

Figure 3:
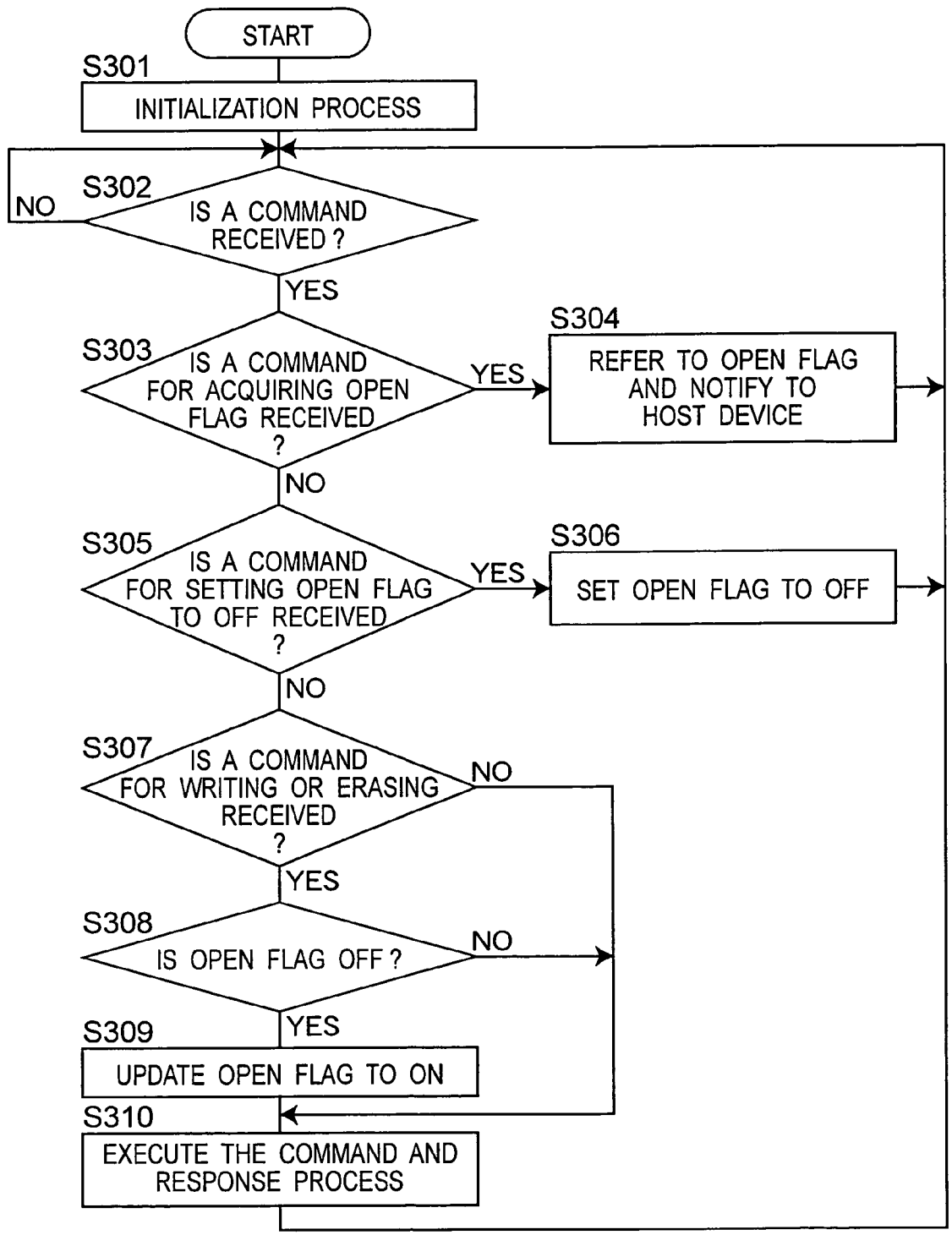
FIG. 3 is a flowchart showing an example of operation of the semiconductor recording medium in the first embodiment of the invention.

FIG. 3 is a flowchart showing outline of operation of the semiconductor recording medium 100 after it is inserted in the host device 200.

The semiconductor recording medium 100, after start of power supply from the host device 200, executes initialization process of the inside of the semiconductor recording medium 100 in response to initialization process request issued through the access section 210 of the host device 200 (S301). Afterwards, the process waits for a command from the host device 200.

When a command is issued from the host device 200, the host interface section 110 receives the command (S302), and notifies it to the controller 120.

The command processing section 121 of the controller 120 interprets the received command. When it is a command for requesting acquisition of a value of the open flag 300 (Yes at S303), the process advances to step S304. Otherwise (No at S303), the process goes to step S305.

At step S304, the command processing section 121 acquires the value of the open flag 300 stored in the data storage section 130 through the recording region access section 123, and notifies the acquired value to the host device 200 through the host interface section 110 (S304). Then the process waits for the next command.

At step S305, the command processing section 121 of the controller 120 interprets the received command. If a command for requesting to update the open flag 300 to "OFF" (Yes at S305) is received, the process goes to step S306. Otherwise (No at S305), the process goes to step S307.

At step S306, the flag updating section 125 sets the value of the open flag 300 stored in the data storage section 130 to "OFF" through the recording region access section 123 (S306), and executes response process to the host device 200 as required, and the process waits for the next command.

At step S307, the command processing section 121 of the controller 120 interprets the received command. If it is a command for requesting to update the digital data stored in the retrieval information storing region 131 and data region 132 (that is, write process request or erase process request) (at S307), the process goes to step S308. Otherwise, the process goes to step S310.

At step S308, the command processing section 121 refers to the value of the open flag 300 stored in the data storage section 130 through the recording region access section 123. If it is "OFF" (presence of consistency), the process goes to step S309, and if "ON" (absence of consistency), the process goes to step S310.

At step S309, the flag updating section 125 sets the value of the open flag 300 stored in the data storage section 130 to "ON" through the recording region access section 123. Thus, the open flag in the embodiment is updated to "ON" by the controller 120 in the semiconductor recording medium 100.

At step S310, the controller 120 executes the process depending on the content of the received command. For example, in the case of a write process request, the logical-physical conversion controller 122 converts the logical address specified by the host device 200 into a physical address. Using the physical address, data is written to the data storage section 130 through the recording region access section 123. In case of a read process request, the logical-physical conversion controller 122 converts the logical address specified by the host device 200 into a physical address. Then the digital data stored in the data storage section 130 is read through the recording region address 123, and transmitted to the host through the host interface section 110.

After executing the process depending on the content of the command, as required, a response to the host device 200 is transmitted through the host interface section 110. After completion of the process, going back to step S302, then waiting for the next command.

The next explanation is about the sequence until completion of mounting process of the host device 200 when the semiconductor recording medium 100 is installed.

Figure 4:
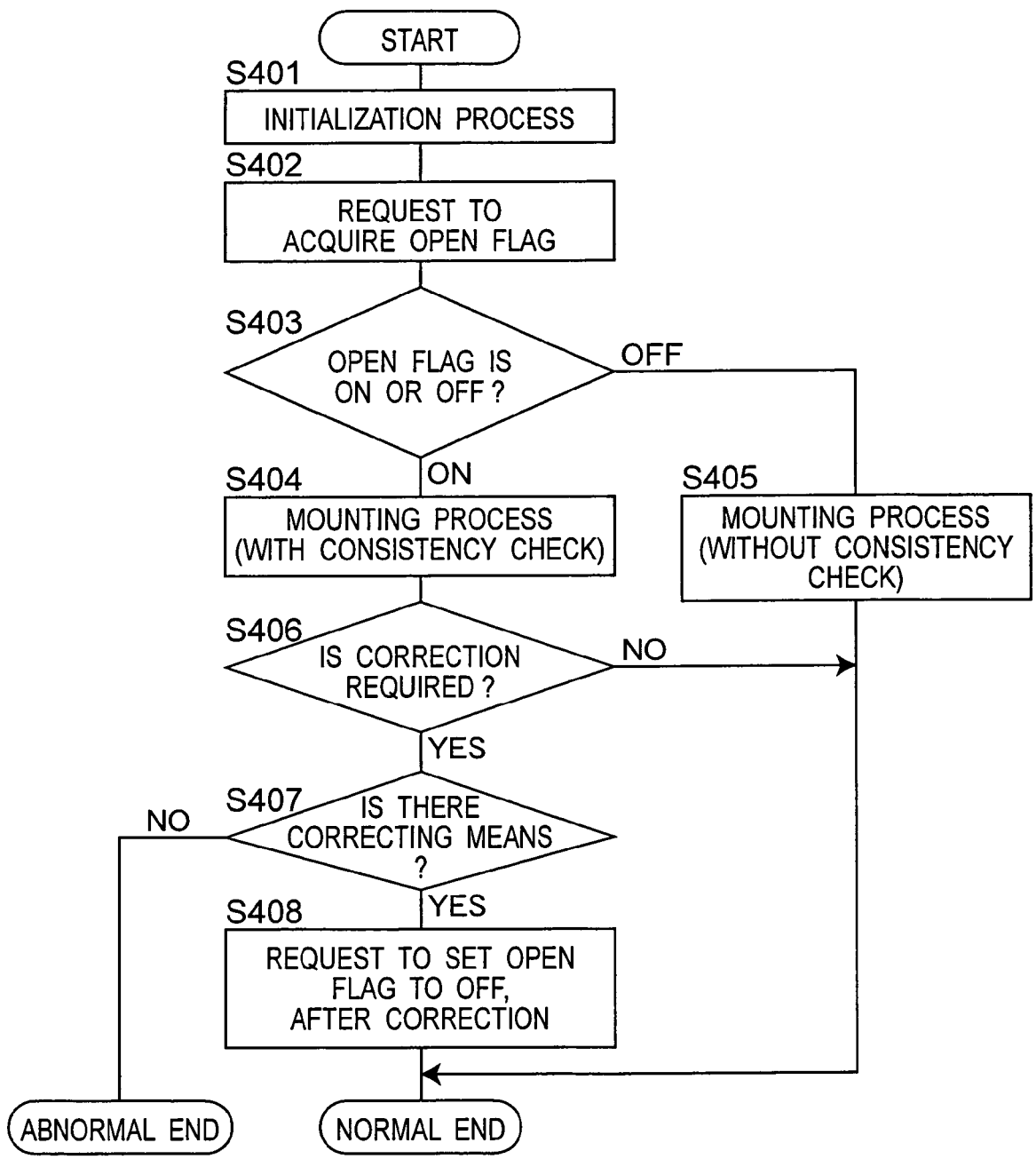
FIG. 4 is a flowchart showing an example of operation from an initialization process of the information recording medium to a mounting process in the host device in the first embodiment of the invention.

FIG. 4 is a flowchart showing an operation sequence example of the host device 200 loaded with the semiconductor recording medium 100.

The host device 200 requests initialization process to the semiconductor recording medium 100 through the access section 210 (S401). After initialization process of the semiconductor recording medium 100, the host device 200 requests acquisition of value of the open flag 300 to the semiconductor recording medium 100 (S402). In this embodiment, the flag processing section 220 issues a special command for acquisition of value of the open flag 300 through the access section 210.

Judging the acquired value of the open flag 300 (S403), if the value is "ON", the host device 200 judges that there is a possibility of inconsistency between the file system management information stored in the retrieval information storing region 131 and the data stored in the data region 132, and executes mounting process including error check process for verifying the consistency (S404).

If error is detected in error check process at step S404 and it is judged to be necessary to correct the file system management information, the process goes to step S407. If not necessary to correct the information, the process is terminated.

At step S407, if the host device 200 has correcting means for the file system management information, the process goes to step S408. If not, an abnormal termination occurs, and a proper error handling is done. For example, the operation is stopped, or the operation is limited to read access only.

At step S408, when correction of the file system management information is over, the flag processing section 220 issues a command for updating the open flag 300 to "OFF" through the access section 210.

On the other hand, at step S403, if the value of the acquired open flag 300 is "OFF", the host device 200 judges that consistency is established between the file system management information stored in the retrieval information storing region 131 and the data stored in the data region 132, and executes the mounting process without error checking process for verifying consistency (S405), and then terminates the process.

In the recording medium in patent document 1, since the open flag is directly updated by the host device, there is a problem that the reliability of the open flag is spoiled if processed by a host device not capable of processing the open flag and inconvenience may occur in the operation in the other host device later processing on the basis of this uncertain flag value. By contrast, in the semiconductor recording medium 100 of the embodiment, upon receipt of a write command or erase command from the host device 200, the semiconductor recording medium 100 automatically sets the open flag to "ON" (S309) certainly by itself. Accordingly, if the recording medium is processed by a host device not capable of processing the open flag, the open flag is always set to ON by the semiconductor recording medium 100. On the other hand, the host device of the embodiment first checks the open flag of the semiconductor recording medium 100 when recording or erasing data, and executes consistency check process when the open flag is ON (S403 to S405). Hence, according to the embodiment, even if the recording medium is processed by a host device not capable of processing the open flag, the reliability of open flag is guaranteed, and then even if the recording medium is processed by the host device supporting the open flag, consistency is checked securely on the basis of the open flag. As a result, the problem possibly experienced in patent document 1 can be avoided.

Next, a sequence of a post-process which is done after the host device 200 finishes a series of write process to the semiconductor recording medium 100 is explained.

Herein, "a series of process" refers to a unit of processing such as "from file opening to file closing" or "from mounting to un-mounting". Upon completion of "a series of write process", if no error is occurs during the process, it is judged that consistency is established between the file system management information stored in the retrieval information storing region 131 and the data stored in the data region 132.

Figure 5:
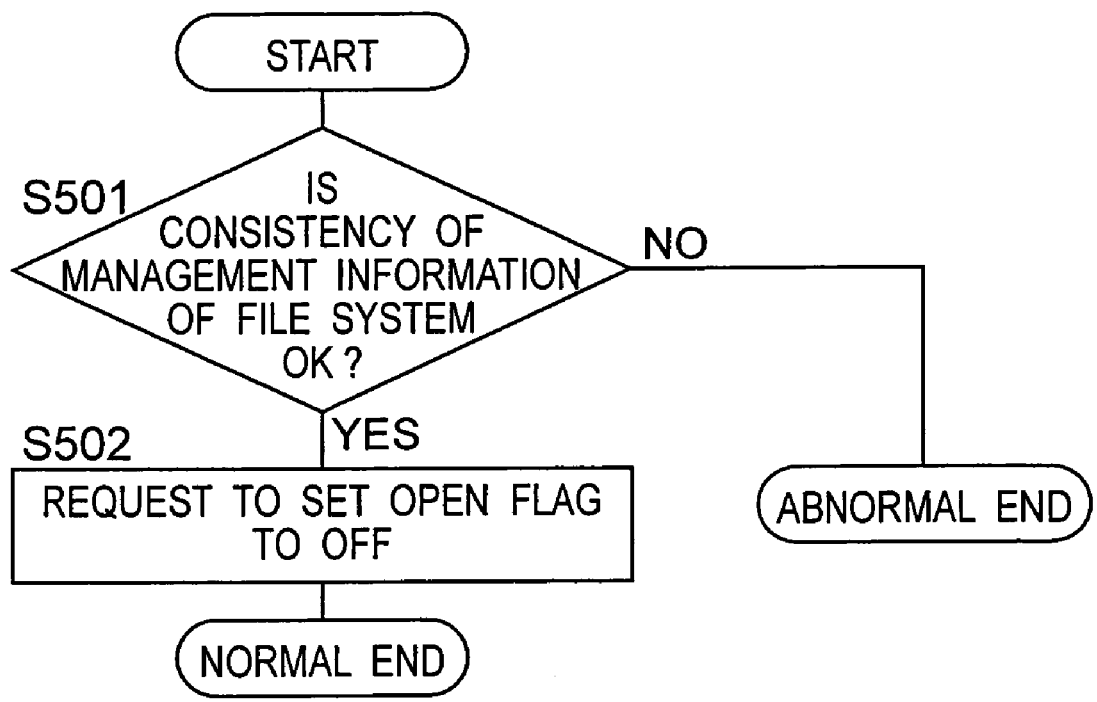
FIG. 5 is a flowchart showing an example of process after finishing of a series of write process in the host device in the first embodiment of the invention.

FIG. 5 is a flowchart showing an example of an operation sequence of the host device 200 in the post-process.

After completion of a series of process, the consistency between the file system management information stored in the retrieval information storing region 131 and the data stored in the data region 132 is verified (S501). When the consistency is established, the flag processing section 220 of the host device 200 requests the semiconductor recording medium 100 to set the value of the open flag 300 to "OFF" through the access section 210 (S502). In this embodiment, it is realized by issuing a special command. The controller 210 of the semiconductor recording medium 100 receives this request to set the open flag 300 to "OFF".

On the other hand, if it is possible that consistency is not established due to an error during series of process or the like (No at S501), it is an abnormal end, and a proper error handling is done.

FIG. 6 shows a state of the open flag 300 of the semiconductor recording medium 100 after a series of write process. As shown in FIG. 6, in the case of the host device 200 of the invention, when the normal end occurs, the open flag 300 is set at "OFF". In the event of abnormal end such as writing error or power failure, it is set at "ON". By contrast, since the conventional host device does not have means for setting the open flag 300 to "OFF", the open flag 300 always is set at "ON" after writing process.

That is, when the series of process is terminated without error, the open flag 300 is returned to "OFF" in this post-processing. If writing process or erasing process is done on the semiconductor recording medium 100 by a conventional host device not supporting the open flag, the post-processing is not executed and the open flag 300 remains at "ON". Thus, afterward, when a host device supporting the open flag accesses this semiconductor recording medium 100 for the first time, the host device can recognize the possibility of inconsistency of the semiconductor recording medium 100 by referring to the open flag 300. On the other hand, when the open flag 300 is "OFF", the consistency is guaranteed between the file system management information stored in the retrieval information storing region 131 and the data stored in the data region 132.

Thus, the semiconductor recording medium 100 of the invention has the open flag 300 provided in the region that cannot be directly accessed by the host device 200, and when receiving a command for updating the data stored in the retrieval information storing region 131 or data region 132 (that is, a write process request or erasing process request) from the host device 200, the semiconductor recording medium 100 automatically sets the open flag 300 to "ON".

The host device 200 of the invention requests the semiconductor recording medium 100 to set the open flag 300 to "OFF" only when consistency is established between the file system management information stored in the retrieval information storing region 131 of the semiconductor recording medium and the data stored in the data region 132.

As a result, the reliability of the open flag 300 which is "OFF" is guaranteed, and the host device 200 can judge if error check process can be omitted or not easily in advance by referring to the open flag 300 at the time of mounting process of the semiconductor recording medium 100. The effect of the invention is greater as error check process takes a longer time. It is hence particularly effective in a semiconductor recording medium much increased in capacity.

Second Embodiment

A second embodiment of the invention is specifically described below.

Figure 7:
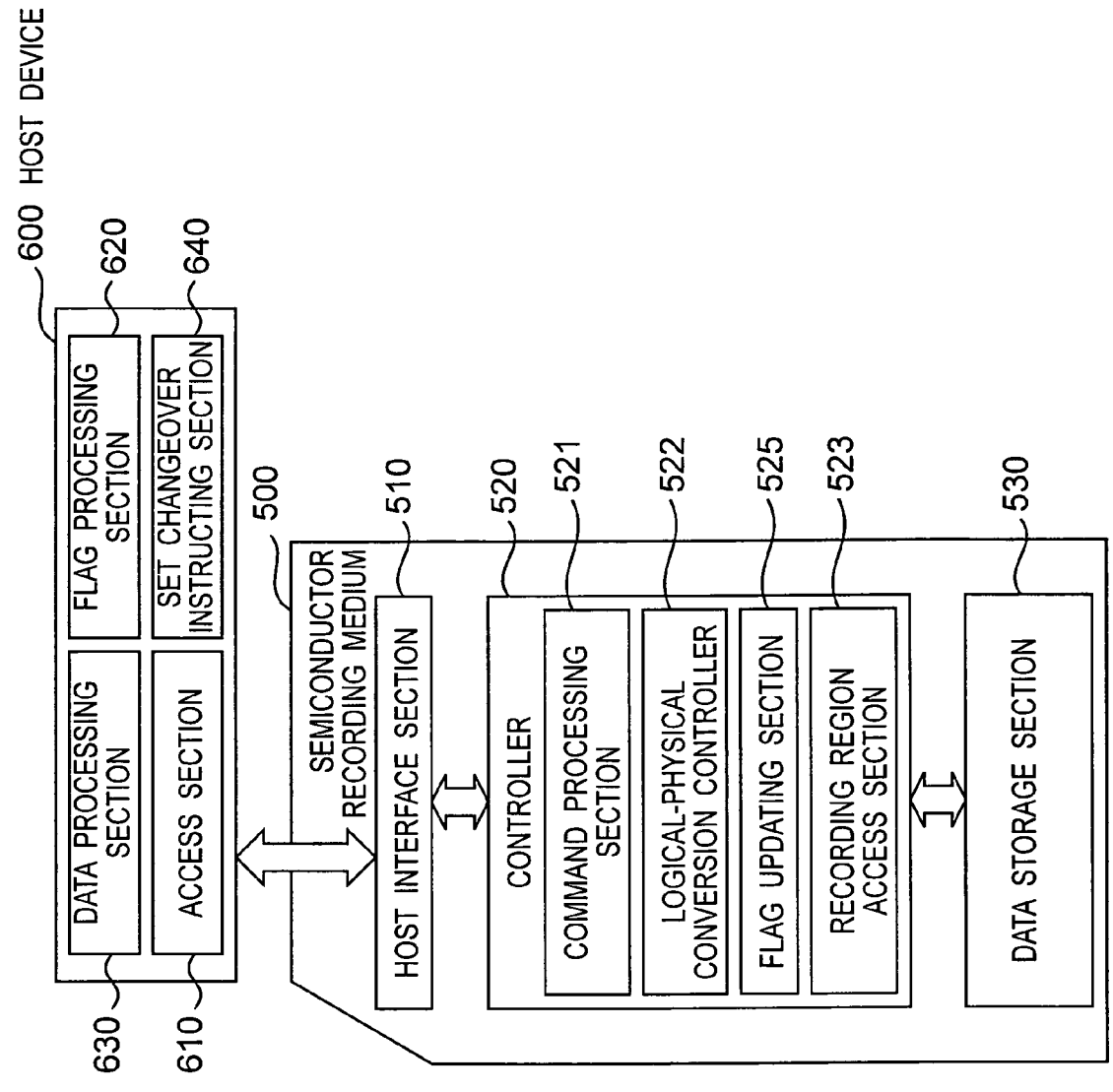
FIG. 7 is a block diagram of the semiconductor recording medium and the host device in a second embodiment of the invention.
Figure 8:
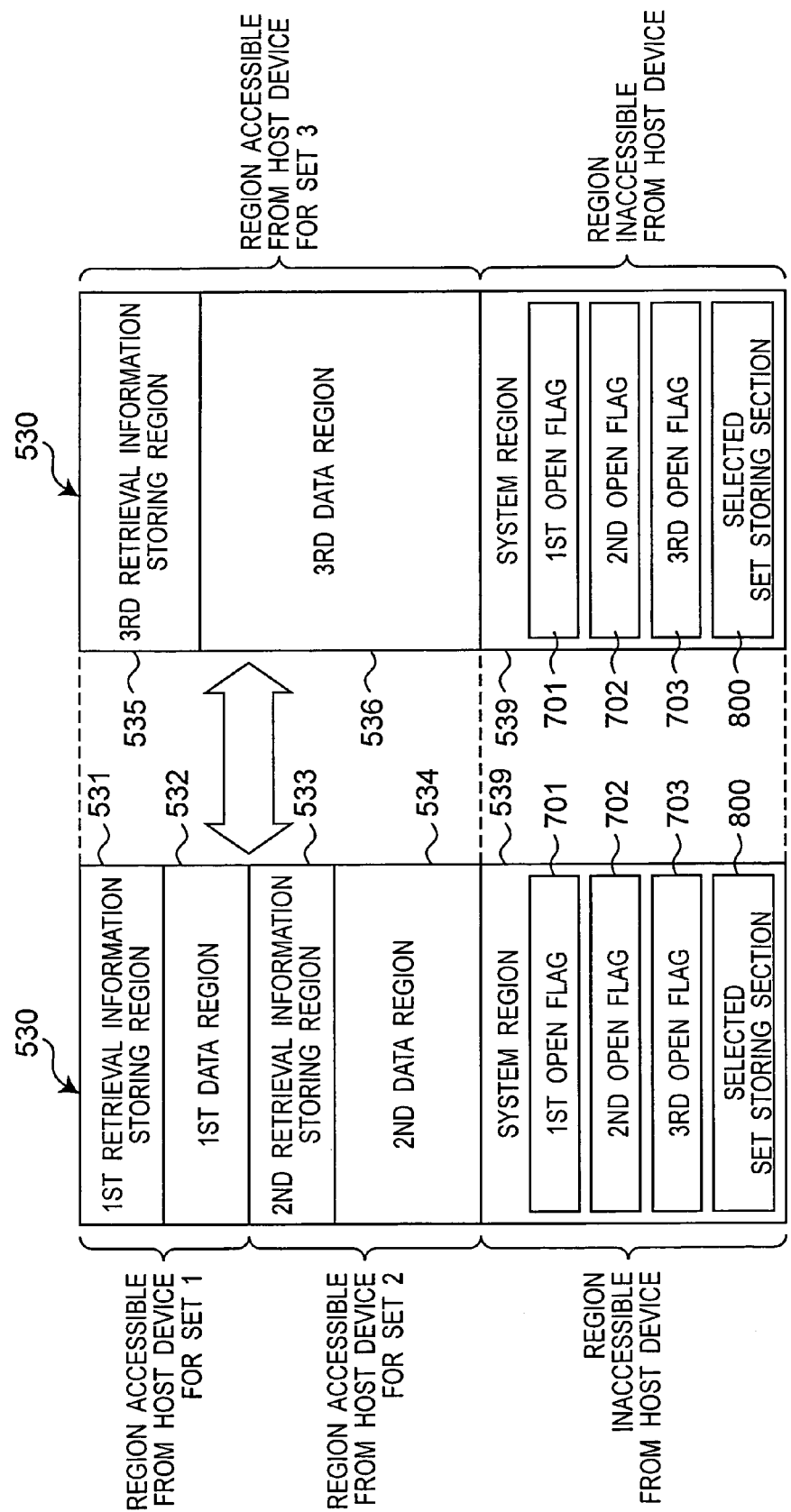
FIG. 8 is a block diagram of the data storage section in the second embodiment of the invention.

FIG. 7 is a block diagram of a semiconductor recording medium 500 and a host device 600 accessing the semiconductor recording medium 500 in the second embodiment. FIG. 8 is a block diagram of a data storage section 530 of the semiconductor recording medium 500.

The semiconductor recording medium 500 in this embodiment differs from the medium in the first embodiment in the following points.

The data storage section 530 of the semiconductor recording medium 500 of the embodiment has three data regions as shown in FIG. 8, and only one region can be set selectively. Accordingly, the data storage section and open flag. These sets are changed over and used by a command from the host device, and only one set is made valid. Accordingly, the data storage section 530 has a selected set storing section 800 for storing the information about the set being valid presently in a system region 539.

The host device 600 in the embodiment differs from the device in the first embodiment in that it includes a set changeover instructing section 640 for instructing changeover of plural sets stored in the semiconductor recording medium 500. That is, in this embodiment, the semiconductor recording medium 500 has three sets, and the host device 600 can change over and use the sets. Each set is described below.

Set 1: It includes a first retrieval information storing region 531, a first data region 532, and a first open flag 701. The host device 600 can access the first retrieval information storing region 531 and first data region 532 only.

Set 2: It includes a second retrieval information storing region 533, a second data region 534, and a second open flag 702. The host device 600 can access the second retrieval information storing region 533 and second data region 534 only. Either one of a pair of the second retrieval information storing region 533 and the second data region 534, and a pair of the first retrieval information storing region 531 and the first data region 532 is selectively made valid.

Set 3: It includes a third retrieval information storing region 535, a third data region 536, and a third open flag 703. The host device 600 can access the third retrieval information storing region 535 and third data region 536 only. The region of the third retrieval information storing region 535 and third data region 536 is equal to the total region of the first retrieval information storing region 531 and first data region 532 and second retrieval information storing region 533 and second data region 534.

Operation of the semiconductor recording medium 500 and host device 600 is described below by referring to the drawing.

Figure 9:
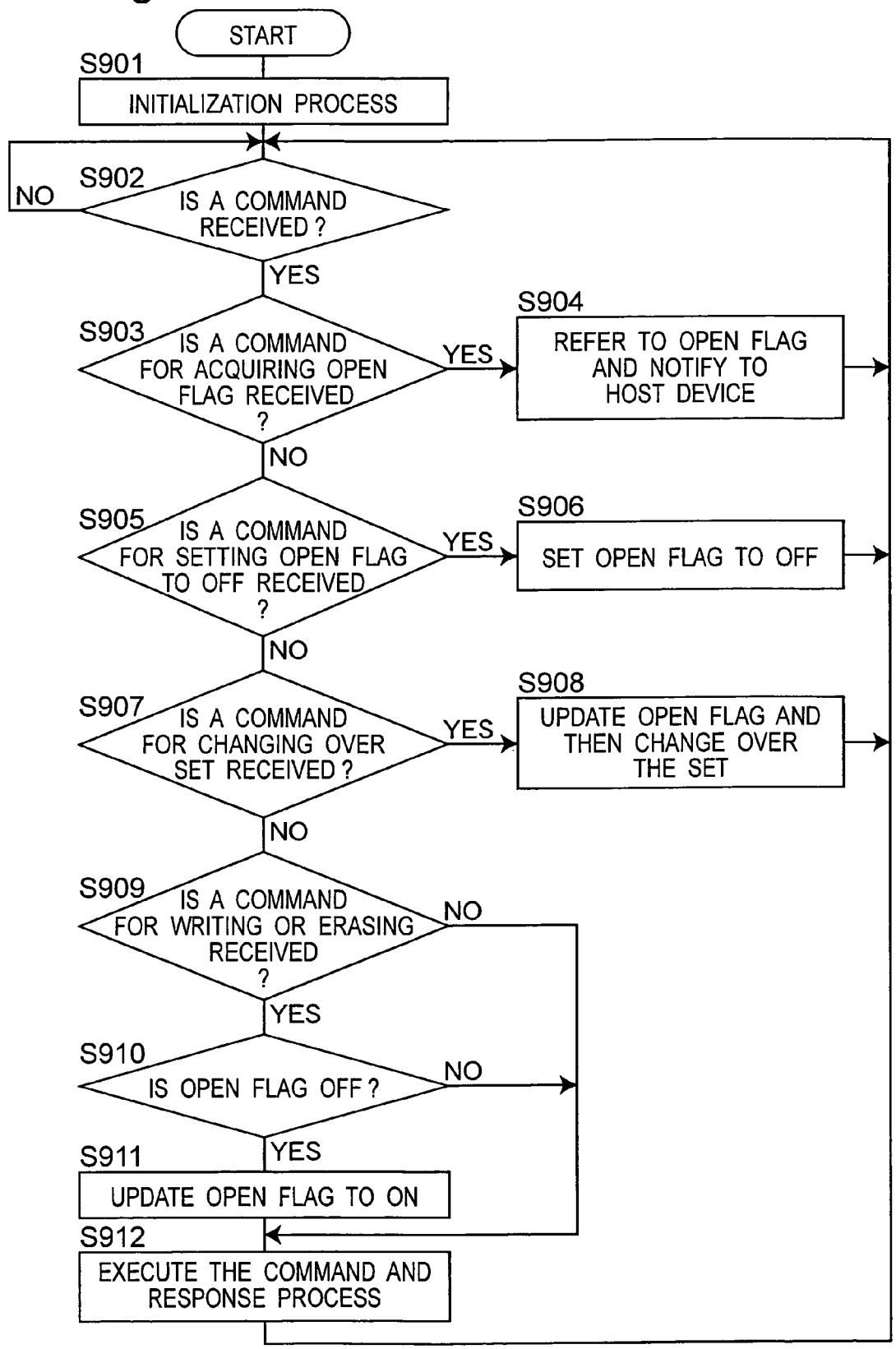
FIG. 9 is a flowchart showing an example of entire operation of the information recording medium in the second embodiment of the invention.

FIG. 9 is a flowchart of outline of operation of the semiconductor recording medium 500 after the semiconductor recording medium 500 is loaded in the host device 600.

After start of power supply from the host device 600, the semiconductor recording medium 500 executes initialization process in the semiconductor recording medium 500 in response to an initialization request issued through the access section 610 of the host device 600 (S901). At this time, a controller 520 refers to the value stored in the selected set storing section 800, and decides to use either one of Set 1, Set 2 and Set 3. In the embodiment, it is supposed that information of the set used previously is stored in the selected set storing section 800. It may be also specified so that a specific set is always made valid at the time of initialization process.

After initialization, the process waits for a command from the host device 600. When a command is issued from the host device 600, a host interface section 510 receives the command (S902), and notifies it to the controller 520.

A command processing section 521 of the controller 520 interprets the received command, and if it is a command for requesting acquisition of value of the open flag (Yes at S903), the process goes to step S904. Otherwise, the process goes to step S905.

At step S904, the command processing section 521 acquires the value corresponding to the set selected by the selected set storing section 800, out of three open flags 701, 702, and 703 stored in the data storage section 530 through the recording region access section 523. The acquired value is notified to the host device 600 through the host interface section 110, and then the process waits for the next command.

At step S905, the command processing section 521 of the controller 520 interprets the received command, and if the command requests to update the open flag to "OFF", the process goes to step S906. Otherwise, the process goes to step S907.

At step S906, the flag updating section 525 sets, through the recording region access section 523, the value corresponding to the set selected by the selected set storing section 800 out of three open flags 701, 702, and 703 stored in the data storage section 530 to "OFF". Then, after response process to the host device 600 as required, the process waits for the next command.

At step S907, the command processing section 521 of the controller 520 interprets the received command, and if the command requests the host device 600 to change over the sets, the process goes to step S908. Otherwise, the process goes to step S909.

At step S908, the flag updating section 525 updates the value of the open flag depending on the sets before and after changeover. More specifically, the flag updating section 525 has an open flag updating table as shown in FIG. 10, and three open flags are updated by referring to the open flag updating table. For example, when changing over from Set 1 to Set 2 as shown in (a) of FIG. 10, the values of open flags 701 and 702 are not changed, and only the open flag 703 is changed to "ON".

Afterwards, the command processing section 521 stores information of the set after changeover to the selected set storing section 800. Then, after execution of response process to the host device 600 as required, the process waits for the next command.

At step S909, the command processing section 521 of the controller 520 interprets the received command, and if the command requests to update data stored in the retrieval information storing region or data region (that is, a write process request, erase process request etc.), the process goes to step S910. Otherwise, the process goes to step S912.

At step S910, the command processing section 521 refers to, through the recording region access section 523, the value corresponding to the set selected by the selected set storing section 800 out of three open flags 701, 702, and 703 stored in the data storage section 530. If the value is "OFF", the process goes to step S911, and if "ON", the process goes to step S912.

At step S911, the flag updating section 525 updates the value corresponding to the state selected by the selected set storing section 800, out of three open flags 701, 702, and 703 stored in the data storage section 530, through the recording region access section 523, to "ON".

At step S912, the controller 520 executes the process corresponding to the received command. For example, in the case of a write process request, a logical-physical conversion controller 522 converts the logical address specified by the host device 600 into a physical address, and writes data to the data storage section 530 through a recording region access section 523 by using the physical address. Or, in the case of a read process request, the logical-physical conversion controller 522 converts the logical address specified by the host device 600 into a physical address, and the digital data stored in the data storage section 530 is read out through the recording region access section 523, and is transmitted to the host through the host interface section 510.

The logical-physical conversion controller 522 can execute appropriate access control by acquiring the information about the set being presently selected, from the selected set storing section 800, through the recording region access section 523.

After execution of process depending on the command content, as required, a response to the host device 600 is transmitted through the host interface section 510. After completion of the process, going back to step S902, the process waits for the next command.

The open flag updating table is compiled according to the following rules.

Between Set 1 and Set 2, accessing regions from the host device 600 do not overlap, and a write process or read process in one set has no effect on the other set. Therefore, it is not required to update the open flag before and after changeover process, and it is "As it stands."

Between set 1 and set 3, or set 2 and set 3, accessible regions from the host device 600 overlap, and a write process or read process in one set has effect on the other set. Therefore, the open flag is "ON" before and after the changeover process.

A sequence of process on the host device 600 side is explained. The sequence until end of mounting process of the host device 600 when the semiconductor recording medium 500 is loaded is exactly same as the operation sequence in the first embodiment shown in FIG. 4.

A post-processing sequence after a series of write process by the host device 600 on the semiconductor recording medium 500 is exactly same as the operation sequence in the first embodiment shown in FIG. 5.

Thus, the semiconductor recording medium 500 of the invention has three sets (combinations) of a retrieval information storing region, a data region, and an open flag. The three sets can be changed over to be used. Upon receipt of a command for updating the data stored in the retrieval information storing region and data region (that is, a write process request or erase process request etc.) from the host device 600, the open flag corresponding to the presently selected set is automatically made ON. It also has a function of notifying the value of the open flag corresponding to the set presently selected, to the host device.

The host device 600 of the invention requests the semiconductor recording medium 500 to set the open flag to "OFF", only when consistency is established between the file system management information stored in the retrieval information storing region and the digital data stored in the data region, in the set presently selected in the semiconductor recording medium 500.

Accordingly, the host device 600 can easily judge if error check process can be omitted, only by referring to the open flag of the presently selected set at the time of mounting process of the semiconductor recording medium 500. The effect of the invention is greater as error check process takes longer time. Therefore it is particularly effective in the semiconductor recording medium much increased in capacity.

In the foregoing embodiments, the following modifications may be considered.

(1) In each embodiment, the semiconductor recording medium is mentioned, but the concept of the invention can be applied to a recording medium incorporating a controller such as a hard disk.

(2) In each embodiment, although the FAT file system is used in the retrieval information storing region 131, other file system may be used such as FAT32 or UDF. In the retrieval information storing region 131, the logical capacity or recording address may be managed without using the file system.

(3) In each embodiment, an example of the semiconductor recording medium 100 presenting, to the host device 200, a special command for reading the value of the open flag 300 is shown, but this special command is not always required. For example, as a part of response information of other commands, the value of the open flag 300 may be notified. In this case, the host device 200 often refers to the value of the open flag 300 before mounting process, and hence it is effective to add the open flag to the response information to the command at the time of initialization process.

(4) In each embodiment, the timing of the host device 200 issuing a request to update the open flag 300 of the semiconductor recording medium 100 to "OFF" is the time a series of writing process ends, but it may be issued anytime as far as consistency is established between the file system management information stored in the retrieval information storing region 131 and the data stored in the data region 132.

(5) When the semiconductor recording medium 100 has a function of executing formatting (logically initializing) process, right after the formatting process, the open flag (in the second embodiment, the flag corresponding to the set to be formatted) may be automatically set to "OFF".

(6) When the host device requests to set the value of the open flag of the semiconductor recording medium to "OFF", the controller of the semiconductor recording medium may verify consistency between the file system management information stored in the retrieval information storing region 131 (in the second embodiment, the one being presently selected) and the data stored in the data region (in the second embodiment, the one being presently selected), and if not consistent, the value of the open flag may not be set to "OFF". At this time, since consistency is verified in both host device and semiconductor recording medium, precision of consistency check is improved, and the processing load is dispersed.

(7) In the second embodiment, the semiconductor recording medium has three sets, but the number of sets is not specified as far as it is two or more.

(8) In the second embodiment, when receiving a region changeover command, the flag updating section 525 refers to the open flag updating table, and updates the value of each open flag (S908), but the timing may not be right after receiving the region changeover command. For example, it may be updated at the timing of receiving a write process request or erase process request for the first time after the region changeover process.

INDUSTRIAL APPLICABILITY

The semiconductor recording medium, host device of the semiconductor recording medium, and data processing method according to the invention are useful as recording medium incorporating a controller or the like for managing digital data by file system, and particularly suited to a semiconductor recording device.

As this invention is explained in specific embodiments, but may be embodied, modified or used in several forms by those skilled in the art. Hence, the invention is not limited by the specific disclosure, but is defined by the appended claims only. This application is related to Japanese Patent Application No. 2004-139581 (filed on May 10, 2004), of which contents are incorporated herein by reference.

What is claimed is:

1. A recording medium for storing data, and which is accessible to and detachable from a host, comprising:
    a data storage that stores various data;
    a host interface that communicates with the host; and
    a controller that controls the recording medium,
    wherein the data storage includes a data region for storing content data, and a retrieval information storing region for storing management information used by the host to acquire the content data, and the data storage further stores an open flag showing a possibility of inconsistency between information stored in the data region and information stored in the retrieval information storing region, and
    the controller updates the value of the open flag automatically to a value showing that there is the possibility of inconsistency, when receiving a write request or erase request to the data storage from the host,
    wherein, when the possibility of inconsistency is determined based on the open flag, the host verifies if an inconsistency actually exists between the information stored in the data region and the information stored in the retrieval information storing region of the detachable recording medium, and when an inconsistency is verified to actually exist, the host initiates an inconsistency correction function or does error handling.

2. The recording medium according to claim 1, wherein the data storage further includes a system region which is a region not directly accessible from the host, and the open flag is stored in the system region.

3. The recording medium according to claim 1, wherein a special command is provided to be used by the host for acquiring the value of the open flag.

4. The recording medium according to claim 1, wherein the controller, when executing initialization, notifies the value of the open flag to the host together with response information for the initialization.

5. The recording medium according to claim 1, wherein even when the host requests to change the value of the open flag to the value showing no inconsistency, the controller checks for inconsistency between the information stored in the data region and the information stored in the retrieval information storing region, and does not change the value of the open flag to the value showing no inconsistency when the checking result suggests inconsistency.

6. The recording medium according to claim 1, wherein the controller includes a function of initializing logically the retrieval information storing region, and automatically updates the open flag to the value showing consistency between the information stored in the data region and the information stored in the retrieval information storing region right after executing the logical initialization.

7. The recording medium according to claim 1, wherein the data region of the data storage can selectively be set in one size out of plural region sizes, the data storage manages the retrieval information storing region, the data region, and the open flag as one set in each size of data region, and further stores information showing one selected set, and
    the controller refers to the information showing one selected set, and accesses the retrieval information storing region, the data region, and the open flag about the one selected set.

8. The recording medium according to claim 7, wherein on changeover of each set, the value of the open flag included in each set is not changed when the data region and retrieval information storing region before changeover do not overlap with those after changeover.

9. The recording medium according to claim 7, wherein the value of the open flag included in each set is updated upon receiving a write process request or erase process request for the first time after changeover, when changeover of each set occurs.

10. The recording medium according to claim 1, wherein the data storage includes a nonvolatile memory.

11. A host for accessing a detachable recording medium, the detachable recording medium including a data region for storing content data, and a retrieval information storing region for storing management information used for reading the content data, and further storing an open flag showing possibility of inconsistency between information stored in the data region and information stored in the retrieval information storing region, the host comprising:
    an accessor that exchanges information with the detachable recording medium; and
    a data processor that controls operation of the host,
    wherein the data processor refers to the open flag, and when the value of the open flag shows a possibility of inconsistency, the data processor executes a verification of checking if an inconsistency actually occurs between the information stored in the data region and the information stored in the retrieval information storing region of the detachable recording medium, and when the value of the open flag does not show the possibility of inconsistency, the verification process is omitted, and
    wherein, when the data processor verifies that an inconsistency actually exists between the information stored in the data region and the information stored in the retrieval information storing region of the detachable recording medium, the data processor initiates an inconsistency correction function or does error handling.

12. The host of claim 11, wherein when judging inconsistency does not occur as a result of the verification, the data processor issues, to the detachable recording medium, a request for updating the value of the open flag to a value showing no possibility of inconsistency.

13. A data processing method being implemented between a host and a detachable recording medium, the recording medium including a data region for storing content data, and a retrieval information storing region for storing management information used for reading the content data, and storing an open flag showing a possibility of inconsistency between the information stored in the data region and the information stored in the retrieval information storing region, the data processing method comprising:
    updating the open flag automatically to a value showing the possibility of inconsistency in the recording medium when a write process or erase process occurs in the recording medium;

verifying, by the host, if an inconsistency actually exists between the information stored in the data region and the information stored in the retrieval information storing region of the detachable recording medium;

transmitting a request for updating the value of the open flag to a value showing no possibility of inconsistency, from the host to the recording medium, after completion of the write process or erase process, only when inconsistency does not occur between the information stored in the data region in the recording medium and the information stored in the retrieval information storing region; and initiating an inconsistency correction function or doing error handling, by the host, when an inconsistency is verified to actually exist.

14. The data processing method according to claim 13, further comprising:

referring to the value of the open flag to judge the presence or absence of inconsistency between the information stored in the data region in the recording medium and the information stored in the retrieval information storing region, and determining, according to a judging result, whether it is required to execute a process of checking a presence or absence of actual inconsistency between the information stored in the data region and the information stored in the retrieval information storing region in the recording medium.

* * * * *